(12) United States Patent
Martinsen

(10) Patent No.: US 9,893,901 B2
(45) Date of Patent: *Feb. 13, 2018

(54) METHOD AND SYSTEM FOR ESTABLISHING A COMBINED LOCAL AREA NETWORK (CLAN) IN A CONFERENCE NETWORK (CN)

(71) Applicant: Cisco Technology, Inc., San Jose, CA (US)

(72) Inventor: Pal-Erik Martinsen, As (NO)

(73) Assignee: Cisco Technology, Inc., San Jose, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/144,198

(22) Filed: May 2, 2016

(65) Prior Publication Data
US 2016/0261421 A1    Sep. 8, 2016

Related U.S. Application Data

(63) Continuation of application No. 13/433,968, filed on Mar. 29, 2012, now Pat. No. 9,331,859.

(51) Int. Cl.
*H04L 12/18* (2006.01)
*H04L 29/06* (2006.01)

(52) U.S. Cl.
CPC ...... *H04L 12/1818* (2013.01); *H04L 65/1006* (2013.01); *H04L 65/1009* (2013.01); *H04L 65/403* (2013.01)

(58) Field of Classification Search
CPC .............. H04L 12/1818; H04L 65/1006; H04L 65/1009; H04L 65/403; H04L 12/18; H04L 12/1813; H04L 12/1822; H04L 12/1827; H04L 12/1831; H04L 12/1859
See application file for complete search history.

(56) References Cited

U.S. PATENT DOCUMENTS

| | | | |
|---|---|---|---|
| 7,237,004 B2 | 6/2007 | Slobodin et al. | |
| 2006/0149815 A1 | 7/2006 | Spradling et al. | |
| 2007/0083470 A1 | 4/2007 | Bonner et al. | |
| 2010/0177667 A1 | 7/2010 | Simmons | |
| 2010/0217837 A1 | 8/2010 | Ansari et al. | |
| 2011/0296506 A1* | 12/2011 | Caspi | H04L 12/1822 726/6 |

\* cited by examiner

*Primary Examiner* — Ian N Moore
*Assistant Examiner* — Brian T Le

(57) ABSTRACT

A method including: receiving, at a conference unit, a command to establish a conference call between the conference unit and another conference unit, the conference unit being connected to at least one access point and the access point being accessible by a terminal; utilizing, by the conference unit, an internet telephony protocol to setup at least one media line between the conference unit and the other conference unit; establishing at least one data channel that transmits LAN traffic between the conference unit and the other conference unit utilizing the internet telephony protocol; establishing, by the conference unit, a connection with the terminal, the terminal being part of a combined local area network; and receiving, at the conference unit, an input from the terminal via the connection to access the combined local area network.

20 Claims, 9 Drawing Sheets

Telepresence conference - SDP offer or answer

```
v=0
o=alice 2890844526 2890844526 IN IP4 host.atlanta.example.com
s=
c=IN IP4 host.atlanta.example.com        Port Number          Initiating
t=0 0                                    Media Protocol       Conf. Unit
m=audio 49170 RTP/AVP 0 8 97             RTP Payload types    IP-adr.
a=rtpmap:0 PCMU/8000
a=rtpmap:8 PCMA/8000          Audio codecs – Payload mapping
a=rtpmap:97 iLBC/8000
m=video 51372 RTP/AVP 31 32
a=rtpmap:31 H261/90000
a=rtpmap:32 MPV/90000         Video codecs – Payload mapping
```

Figure 3 illustrates an example of data information exchanged between two conference units when setting up an Audio media line and a Video Media Line.

Telepresence conference with LAN media line - SDP offer or answer

```
v=0
o=alice 2890844526 2890844526 IN IP4 host.atlanta.example.com
s=
c=IN IP4 host.atlanta.example.com
t=0 0
m=audio 49170 RTP/AVP 0 8 97
a=rtpmap:0 PCMU/8000
a=rtpmap:8 PCMA/8000
a=rtpmap:97 iLBC/8000
m=video 51372 RTP/AVP 31 32
a=rtpmap:31 H261/90000
a=rtpmap:32 MPV/90000
    m=application 7324 UDP/EOIP *       ← Payload types
    a=tunnelname:some_tunnel    ← Media line Identifier
    a=ttl:0 ← Exemplary value
```

With annotations: 7324 = Port Number; UDP/EOIP = Transport Protocol

Figure 4

METHOD AND SYSTEM FOR ESTABLISHING A COMBINED LOCAL AREA NETWORK (CLAN) IN A CONFERENCE NETWORK (CN)

The present application is a continuation under 37 C.F.R. § 1.53(b) and 35 U.S.C. § 120 of U.S. patent application Ser. No. 13/433,698 entitled "METHOD AND SYSTEM FOR ESTABLISHING A COMBINED LOCAL AREA NETWORK (CLAN) IN A CONFERENCE NETWORK (CN)" and filed Mar. 29, 2012, which is incorporated herein by reference.

TECHNICAL FIELD

The exemplary embodiments described herein relate to a method, system, and non-transitory computer readable storage medium for establishing a Combined Local Area Network (CLAN) in a Conference Network (CN).

BACKGROUND

Participants in a Teleprecense Conference (TC) utilize Conference Units (CUs) to access an associated CN with the purpose to exchange a telepresence image with other participants. At the same time, the TC participants may also select to utilize terminals, such as a personal computer or other network connected devices, to access LAN networks with the purpose to communicate over the intranet, extranet or internet. However, in existing solutions a participant in a TC is unable to use a terminal to access the CN via a LAN network.

BRIEF DESCRIPTION OF THE FIGURES

In order to make the exemplary embodiment more readily understandable, the discussion that follows will refer to the accompanying drawings, wherein

FIG. 3 illustrates an example of data information exchanged between two conference units when setting up an Audio media line and a Video Media Line;

FIG. 4 illustrates an example of data information exchanged between two conference units when setting up media lines for Audio, Video and LAN traffic;

DESCRIPTION OF EXAMPLE EMBODIMENTS

Overview

Figure 1:
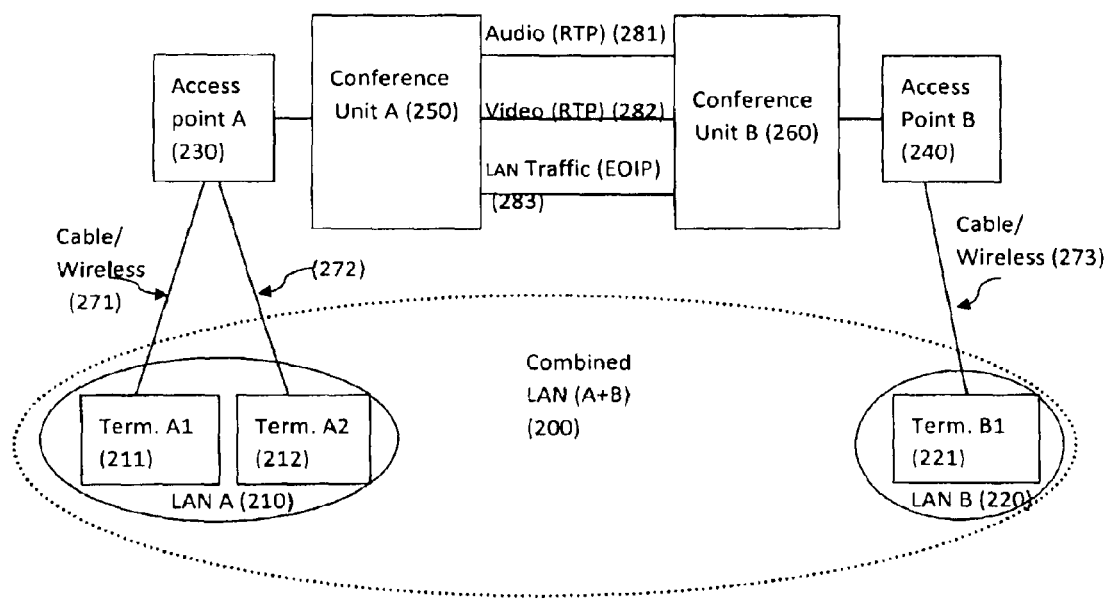
FIG. 1 illustrates an example of a Conference Network operating together with a Combined LAN network.

A method comprising: receiving, at a conference unit, a command to establish a conference call between the conference unit and another conference unit, the conference unit being connected to at least one access point and the access point being accessible by a terminal; utilizing, by the conference unit, an internet telephony protocol to setup at least one media line between the conference unit and the other conference unit; establishing at least one data channel that transmits LAN traffic between the conference unit and the other conference unit utilizing the internet telephony protocol; establishing, by the conference unit, a connection with the terminal, the terminal being part of a combined local area network; and receiving, at the conference unit, an input from the terminal via the connection to access the combined local area network.

A method comprising: receiving, from a display connected to a conference unit, SSID and password to access a WLAN; transmitting, at a terminal, the SSID and the password to an access point connected to the conference unit; receiving, at the terminal, a LAN acknowledge message from the access point; connecting the terminal to a LAN formed by the terminal, the access point, and the conference unit, wherein the LAN is part of a combined local area network; and utilizing, at the terminal, at least one auto discovery protocol to access at least one available resource in the combined local area network.

Other embodiment discussed herein may pertain to a conference unit, a terminal, or a non-transitory computer readable storage medium encoded with instructions to execute the above methods.

DETAILED DESCRIPTION

In the following, exemplary embodiments will be described by referring to the accompanying drawings. However, people skilled in the art will realize other applications and modifications are possible.

Embodiments described herein relate to method, system, and non-transitory computer readable storage medium for establishing a Combined Local Area Network (CLAN) in a Conference Network (CN) and for sharing resources between terminals accessing the CLAN. The various LANs, accessible by the terminals to the different Teleprecense Conference (TC) participants, are combined together into one CLAN, by setting up LAN media lines between the Conference Unit (CUs) in the CN. The LAN media lines tunnels LAN traffic between the CUs and allows terminals to use discovery protocol to locate and access other terminal resources and allows terminals to use same cloud services.

To enable TC participants, via their respective terminals, to access the same LAN network and share resources, a solution for establishing a Combined Local Area Network (CLAN) in a Conference Network (CN) is presented. A participant in a TC may have access to different kinds of LAN. The LAN may be WiFi LAN, traditional cable Ethernet LAN or other forms of wireless LAN. In addition, some of the TC participants may be located at different places and have access to other LANs than other TC participants.

Figure 2:
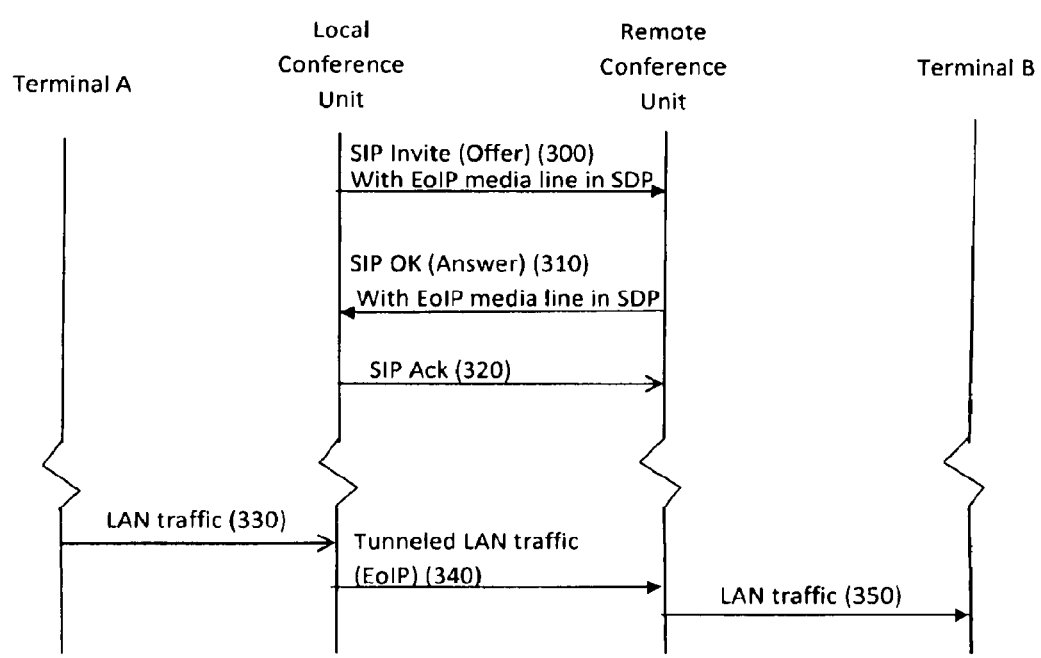
FIG. 2 illustrates setup of a Combined LAN network and sharing of resources between two terminals in the network.

The LANs available to the TC participants may be connected together to form a CLAN, as shown in FIG. 1. FIG. 1 illustrates an example of a Conference Network operating together with a CLAN network. In the example, LAN A (210) is connected with LAN B (220) to form a CLAN (200). The example in FIG. 1 shows only two LANs. However, a CLAN may connect more than two LANs together. In FIG. 2, each Terminal (211, 212, 221) is connected (271, 272, 273) to a local access point (230, 240) and each access point is further connected to a CU (250, 260). The terminal may be a computer (laptop, desktop, or tablet)

or a mobile communications device (i.e., cell phone or personal digital assistant). The CU may include, for example, the Cisco TelePresence MX200 and MX300, Cisco TelePresence System 3000 Series, Cisco TelePresence System 3200 Series, Cisco TelePresence System 1300 Series, or Cisco TelePresence System T3. The local access point may include, for example, Cisco Aironet 3600 Series, Cisco Aironet 3500 Series, or Cisco Aironet 1140 Series. The local access point may also be a switch, a router, or a mobile phone.

The CUs are interconnected via media lines configured to transport Audio (281) and Video (282) traffic utilizing the Real-Time Transport protocol (RTP). However, other protocols may be used. The CUs may be interconnected by other media lines, only audio line, or only video lines. For example, FIG. 1 includes additional media lines between the CUs to transport Ethernet over IP LAN traffic (283). The LAN media lines (283) connect the different LANs and function as a basis for communication channels in a CLAN. By establishing a CLAN, the CN is connected with the LANs and as such the networks are not segmented. The CUs may utilize a dedicated telepresence network that the terminals are not permitted to access, which results in segmenting the LANs from the telepresence network. The embodiment described here enables the terminals (and their LANs) to connect to the CU via an adhoc wireless network (which avoids the firewall around the telepresence network). The addition of the Ethernet over IP LAN traffic (283) line enables communication and file sharing between the terminals and their LANs that are part of the ad hoc wireless network.

In an exemplary embodiment, the CU initiating the TC automatically establishes the CLAN when the TC is being established, and each CU comprises an extra software function for setting up additional media lines for LAN traffic. Standard internet telephony protocols such as SIP, H.323, XMPP or any other session setup protocols that are today used to establish a TC may also be utilized for setting up the LAN media lines. IP telephony (Internet Protocol telephony) is a general term for the technologies that use the Internet Protocol's packet-switched connections to exchange voice, fax, and other forms of information that have traditionally been carried over the dedicated circuit-switched connections of the public switched telephone network (PSTN). If for example the SIP protocol is used to set up a TC, the Session Description Protocol (SDP) is used to negotiate what types of media that are allowed to flow between the terminals. This negotiating is called the Offer/Answer model and is defined in the IETF standard, RFC 3264. SDP is used to negotiate between audio/video codecs and in the Offer/Answer model the local side informs the remote side what kinds of codecs, RTP payloads and ports are being used. Once the remote side receives the Offer, an Answer is generated describing what codecs the remote side understands and what kind of RTP payloads and ports may be used. If the remote side is not able to understand any of the video codecs suggested in the Offer, the video stream is not set up. The session is then only established with audio stream(s).

FIG. 2 illustrates a sequence diagram example for setting up and sharing resources in a CLAN network. In the example, SIP is utilized for establishing the CLAN network. The figure shows how a local CU, initiating a TC, is sending a SIP Invite message (300) to a remote CU. The SIP Invite message is an Offer, wherein the Offer contains information about codecs, RTP payloads and ports that may be utilized. Once the remote CU receives the Offer, the CU generates an Answer describing what codecs the CU understands and what RTP payloads and ports that can be used. The remote CU sends the Answer as a SIP OK message (310) back to the local CU, wherein the message contains information about which codecs, RTP payloads and ports that are acceptable to use. If the answer is acceptable to the local CU, a SIP Acknowledge message (320) is sent back to the remote CU, resulting in one or more LAN media lines being established between the two CUs and allowing for LAN traffic (data transmitted from the terminals) to be sent between terminals (330, 340, 350). If more than two CUs are participating in the TC, the initiating CU executes the connection procedure towards each CU.

As shown in FIG. 2, when LAN traffic is transmitted between the Local CU and the remote CU, the traffic is tunneled as Ethernet over IP traffic (340). When setting up a CLAN, the CUs inform other CUs about their IP addresses, and as such the media lines for LAN traffic may be established and LAN traffic may be tunneled between the various CUs. Ethernet traffic may be transmitted from one LAN to another LAN and as a result a terminal may use discovery protocols to find and access available resources in another LAN, and as such the LAN being offered to another TC participant.

In a TC, the SDP Offer contains at least two media lines, one describing the audio media line and one describing the video media line. The SDP Offer informs the remote CU what kind of codecs are supported and where the audio stream and the video stream can be received. In a TC session the media line for the Audio traffic may be first established and then secondly a media line for the video traffic is established. This is called escalation. A user may escalate an audio call to video. Usually both audio and video are offered in the first SDP. However, the opposite order could be employed. FIG. 4 illustrates an example of data information exchanged between two conference units when setting up an audio media line and a video media line. The example shows the details in data traffic transmitted from a CU, and more specific what kind of attributes such as media protocol, payload types and payload mapping for transporting audio and video traffic are selected by the CU.

Figure 5:
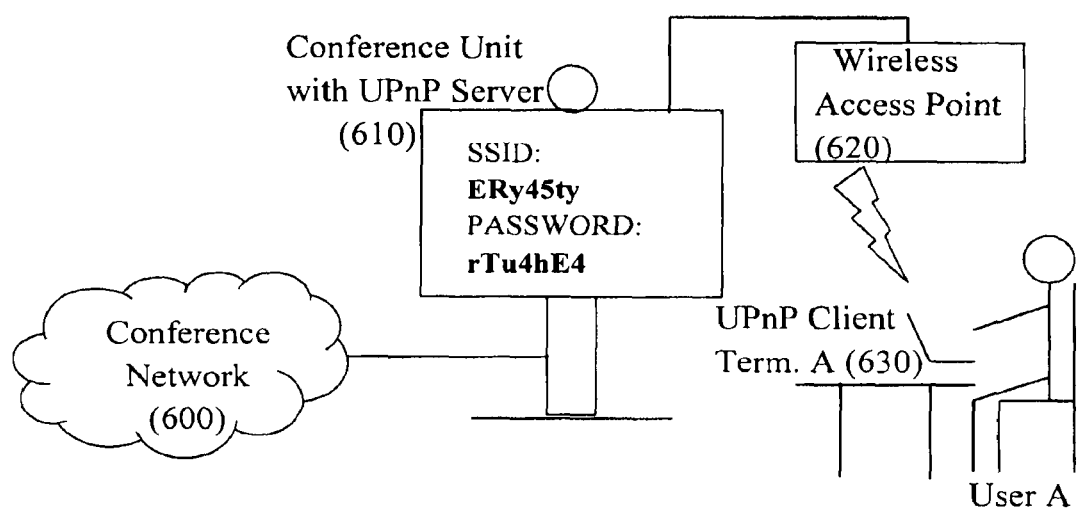
FIG. 5 illustrates an example of a Telepresence Conference participant accessing a wireless LAN.

An exemplary embodiment provides an option of adding a media line for LAN traffic. FIG. 5 illustrates an example of data information exchanged between two conference units when setting up media lines for Audio, Video and LAN traffic (i.e., an example of the above-mentioned offer). The example shows the selection of attributes such as transport protocol, payload types, tunnelname and ttl (time to live), when establishing the LAN media line. In the example, the shown data communication informs the remote CU to listen at port 7324 for UDP packets containing EoIP information. If the remote CU understands and accepts the media line configuration, the remote CU creates an Answer describing where the remote CU terminates the EoIP tunnel. As such, the example shows how a SIP session may be used to combine two different LANs to setup a CLAN.

In the above example, the LAN media lines between the CUs are established when the TC session is started. Subsequently, when access to a CLAN network is requested by a terminal user, the user's terminal is connected to a CU and the LAN media lines via associated access points as shown in FIG. 1. However, the LAN media lines may be establishes after the TC session is started.

Participants in a TC may be physically located at many different places and as such some of the participants might not have access to an enterprise LAN. To solve the problem of local connectivity, a configurable WLAN Access Point may be utilized. FIG. 5 illustrates an example of a TC participant accessing a WLAN. The User A starts the connectivity feature on the CU by, for example, using a CU remote control, using a screen menu or by other means such as a special button preconfigured to automatically enable the wireless connectivity feature. When the CU (610) receives the start signal, the CU selects a SSID and a Password and shows them on a screen (610) (the SSID and Password may transmitted to the User A by other means, such as email, instant message, or text message to User A's mobile telephone). To access the local WLAN and thereby the CLAN, the User A enters SSID and Password into the Terminal A (630), and as a result connecting Terminal A (630) with the Access Point (620). The User A is then given access to the CLAN.

Figure 6:
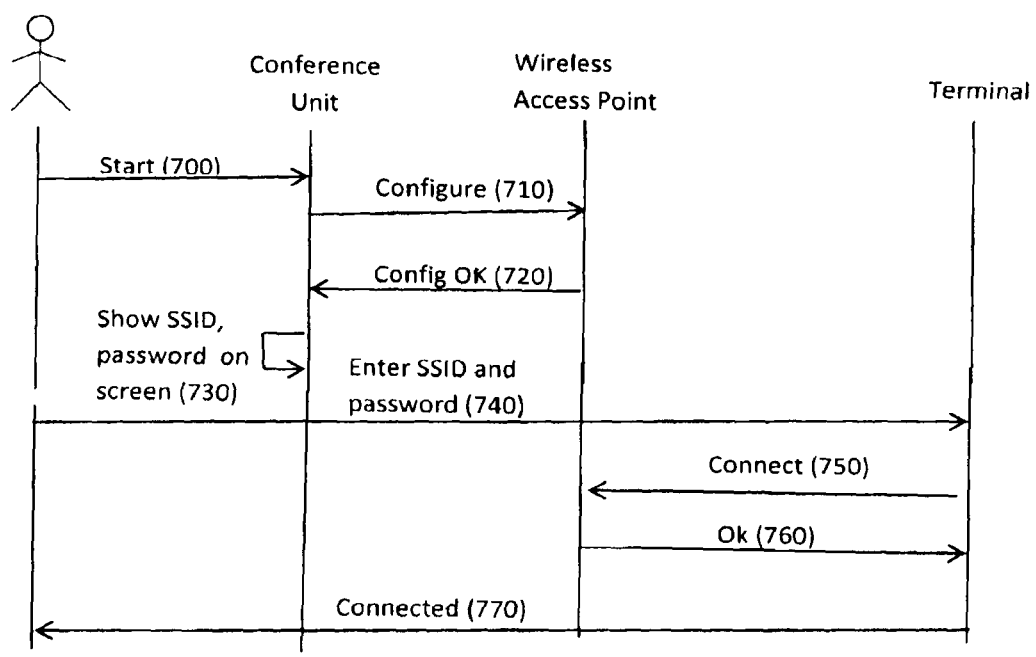
FIG. 6 illustrates a sequence diagram for a Telepresence Conference participant accessing a Combined LAN.

FIG. 6 illustrates a sequence diagram for a TC participant accessing a CLAN. The procedure starts when a participant activates the connectivity feature on the CU, and as a result the CU receives input to configure the WLAN (700). When receiving the start message, the CU configures the associated WLAN Access Point with a predefined or random SSID and password. An Access Point may support remote administration via Web or a CLI (command line interface) via SSH (secure shell) (710). However, other protocols could be utilized. The wireless access point replies with an OK message when the configuration is successful (720). Upon successful configuration of the access point, and wherein the WLAN Access Point is set to secure mode, the configured SSID and Password are shown at the screen of the CU or at other displays (730) (i.e., LED, LCD, plasma, or CRT display devices). The TC participants viewing the access code message at the screen may enter the access code into a terminal (740). Upon receiving the access code the terminal sends a connect message to the wireless access point (750). If the access code is accepted, the wireless access point replies with an OK message (760). When receiving the OK message, the terminal informs the terminal user, via the Graphical User Interface, that that the terminal is connected (770).

In a lower security mode, the SSID is broadcasted by the wireless access point and only the password is shown on at the CU screen. A TC participant may then only need to type in the password to access the CLAN. If the access point is connected to the terminal via an Ethernet cable, an additional layer may be added that requires the terminal to provide the password. Alternatively, in an open mode configuration, the CU and the Ethernet access points may setup all the connected terminals automatically when establishing the media lines. In such a case, the participants need not to manually type in any access code.

Depending on the CU configuration, terminals may only have access to local LAN resources (i.e., files stored on the terminal or peripheral hardware devices connected to the terminal), only Internet, or limited or full access rights to a CLAN. Accordingly, a TC participant may therefore be given guest network access to the corporate LAN, access only to the local CU, that is useful for easy dialing and conference configuration from the user terminal, or may have access to a CLAN network wherein all the TC participants, both remote and local, can share resources via their respective terminals. The terminals may share resources such as, for example a file, a printer, a scanner, a robot, any other network connected device or any other software stored information. As an example, a printer connected to a terminal may be used by other terminals, when the terminals are allowed to access and manage the terminal's resources. Sharing files includes transmitting the file from one terminal to another terminal. Sharing files does not merely include viewing a common screen during a video conference.

Figure 7:
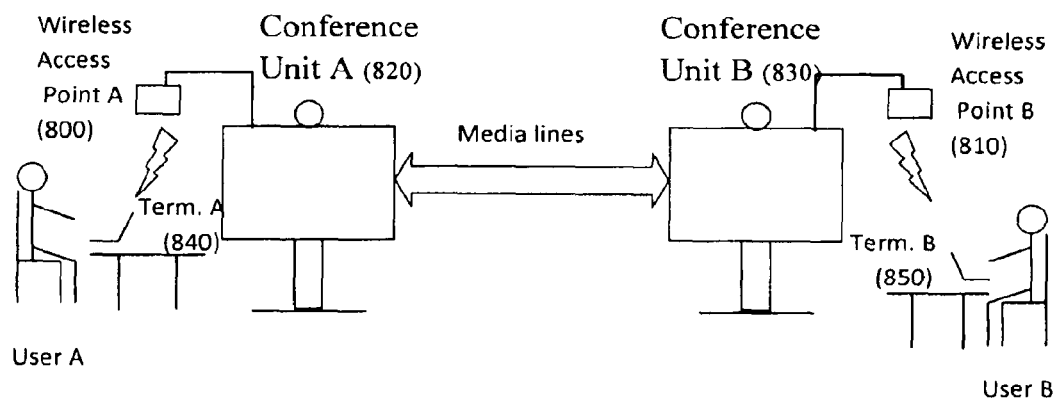
FIG. 7 illustrates an example of two Telepresence Conference participants accessing a Combined LAN using associated terminals and sharing resources.

FIG. 7 illustrates an example of two TC participants accessing a CLAN using associated terminals and sharing resources. To reveal available resources UPnP, DLNA, Bonjour, DHCP or other network sharing protocols may be used to discover the services available in the CLAN. In FIG. 7, Terminal A (840) may send LAN traffic to Wireless Access Point A (800) which forwards the traffic data to CU A (820). CU A (820) forwards the traffic to CU B (830). LAN traffic that is transmitted between the CUs is tunneled with Ethernet over IP, since CUs function on an IP level. On the other side, CU B (830) forwards the LAN traffic to the Wireless Access Point B (810), which sends the LAN traffic to Terminal B (850). LAN traffic may also be transmitted the opposite way from Terminal B (850) to Terminal A (840) or to other connected terminals.

Figure 8:
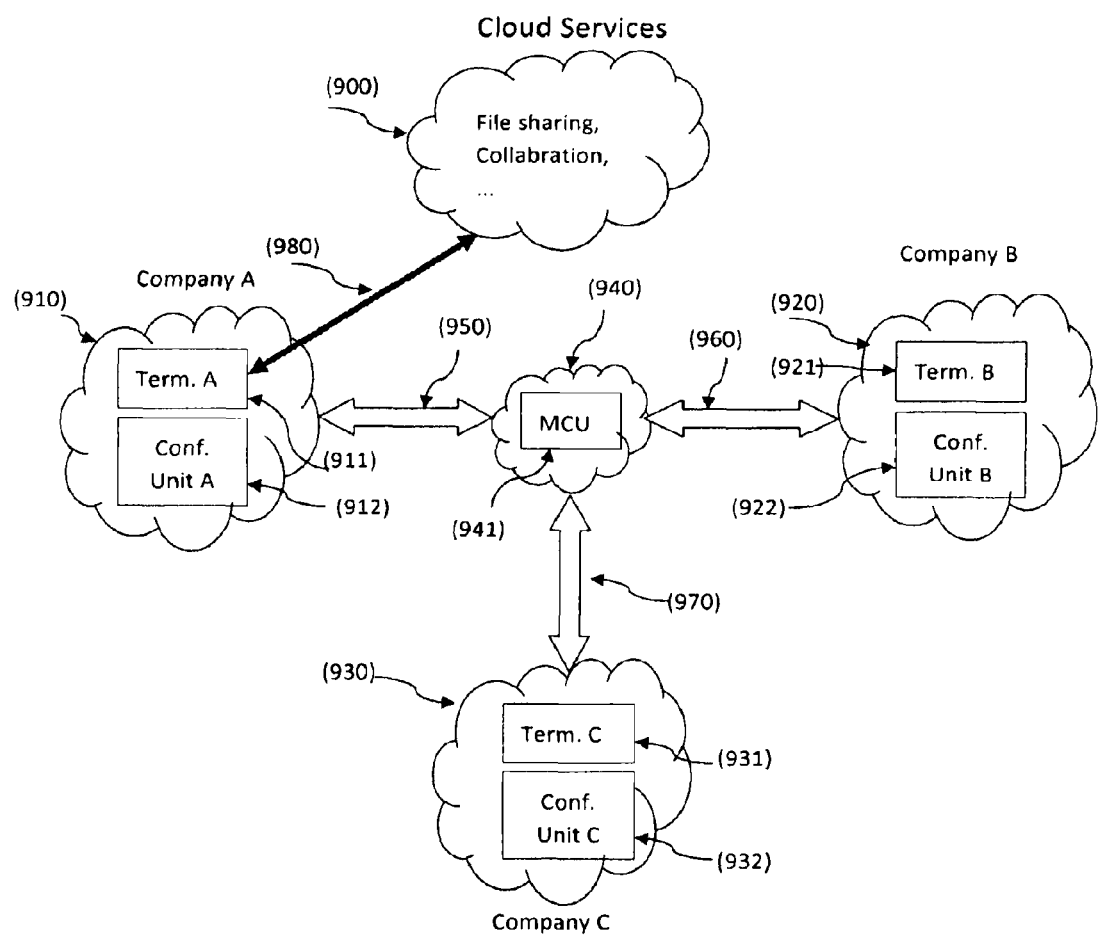
FIG. 8 illustrates an example of terminals accessing cloud services utilizing a Combined LAN.

Overall, a TC may involve utilizing a plurality of CUs located at a number of places and each CU may further be connected to a number of different LANs. In addition, a bridge such as Multipoint Control Unit (MCU) or other units may control the TC and be connected to a LAN. A CLAN may also be established in such a CN. In the solution, all the terminals in the CLAN located at different places and being connected to different LANs may access the same cloud service. FIG. 8 illustrates an example of terminals accessing cloud services utilizing a CLAN. The terminals A, B and C (911, 921, 931) may be interconnected via their respective CUs (912, 922, 932) to form the CLAN. In the example, the CLAN is based on the local company LANs (910, 920, 930) and the media lines (950, 960, 970) are controlled by a MCU (941). The MCU (941) may also have access to a LAN (940) that can be added to the CLAN, but in such a case the MCU must have implemented the same software function for setting up LAN media lines as the CUs. Further, the terminals in the CLAN may connect to a Cloud to access cloud services such as for example file sharing or collaboration. In FIG. 8, Terminal A (911) is connected to the Cloud (900) and is able to access cloud services.

Furthermore, if the terminals (921,931) are given access to Terminal A's resources, the other terminals (921,931) in the CLAN may also access the same cloud services utilizing the same connection (980) as Terminal A (911). As such, local IT (Information Technology) policies for LAN access, that might deny a terminal access to cloud services, may be avoided in a secure manner by allowing the terminal access to cloud services via the CLAN. In addition, since the terminals B and C are allowed to use terminal A (911) resources, the terminals B and C may access and use the same cloud services. As such, there is not a problem that TC participants are operating with different cloud services and having registered different types of cloud accounts, since the cloud services and accounts may be shared as a resource to other TC participants.

There are several advantages with the exemplary embodiments described herein. The exemplary embodiments allows for easy sharing of resources between all participants in a TC independent of location and given network privileges. The exemplary embodiments provide security and simplicity for a TC participant accessing the local LAN network. The access point may be configured to have a predefined or a random SSID, be configured to broadcast or not broadcast SSID, and to have a random access password selected for each session.

Further, the exemplary embodiments allow for use of autodiscovery protocols, such as UPnP. All devices connected to the local LAN network are able to discover the CN and as such access the CLAN. In addition, the TC may be controlled by a Graphical User Interface at a terminal instead of at a CU remote controller and as such making the TC more intuitive to configure and to control.

Figure 9:
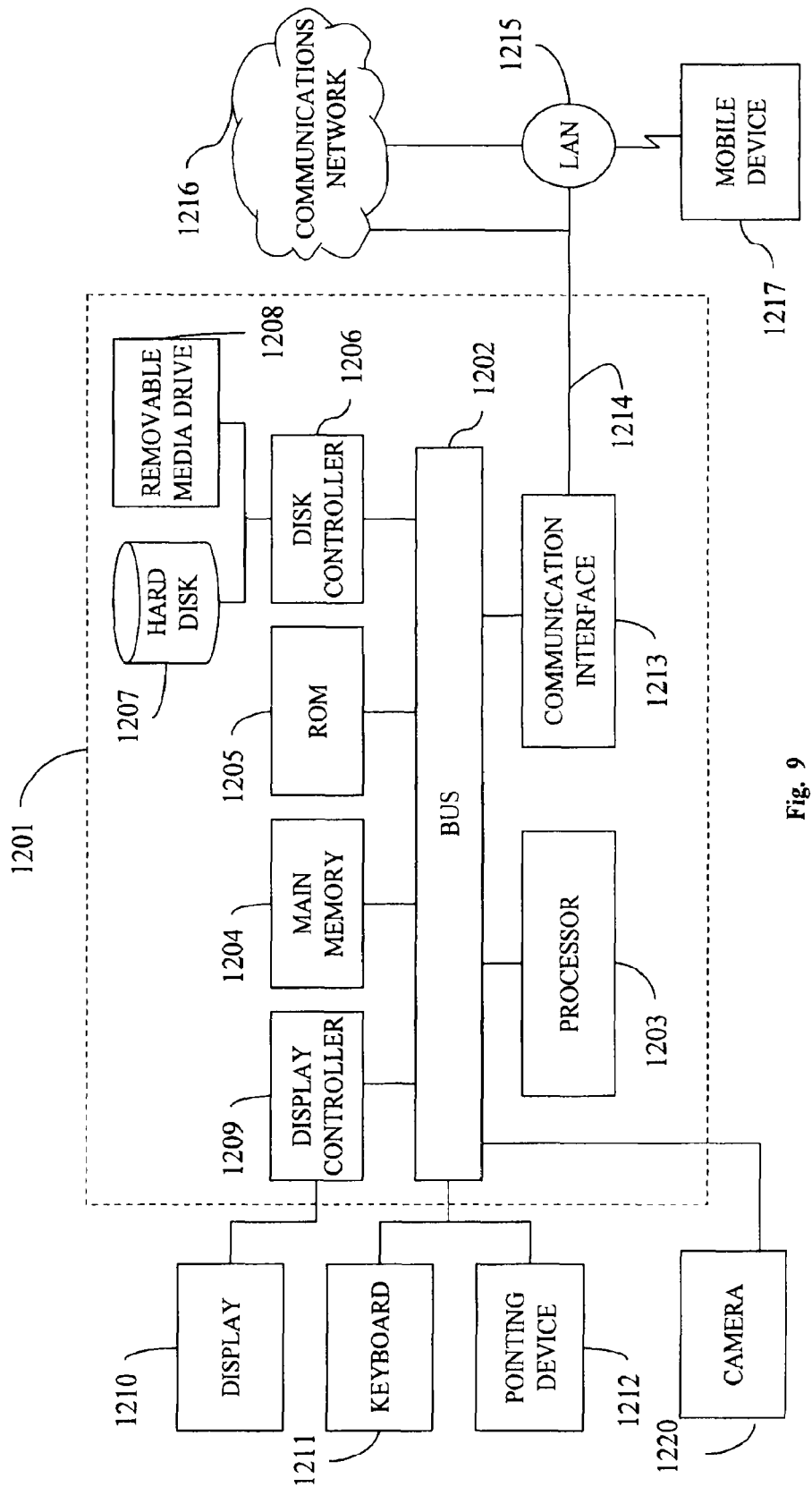
FIG. 9 illustrates an example of a computer system upon which conference unit, access, point, or terminal may be implemented upon.

FIG. 9 illustrates a computer system 1201 upon which an embodiment of the terminal, conference unit, or access point may be implemented. Not all the hardware feature as are necessarily present in each of the terminal, conference unit, and access point. The hardware shown in FIG. 9 may be programmed to implement the functions for each of the terminal, conference unit, or access point. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps noted above in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the exemplary embodiments discussed above and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium.

Stored on any one or on a combination of computer readable media, the embodiment described herein may include software for controlling the computer system 1201, for driving a device or devices for implementing the exemplary embodiments discussed above, and for enabling the computer system 1201 to interact with a human user. Such software may include, but is not limited to, device drivers, operating systems, development tools, and applications software.

The computer code devices may be any interpretable or executable code mechanism, including but not limited to scripts, interpretable programs, dynamic link libraries (DLLs), Java classes, and complete executable programs. Moreover, parts of the processing of the exemplary embodiments discussed above may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the exemplary embodiments discussed above remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method comprising:
   receiving, at a first conference unit, a command to establish a conference between the first conference unit and a second conference unit using a first data channel configured to transport audio traffic for the conference and a second data channel configured to transport video traffic for the conference, the first conference unit being connected to a first terminal of a first local area network (LAN), the second conference unit being connected to a second terminal of a second LAN;
   establishing, by the first conference unit, a third data channel between the first conference unit and a second conference unit, the third data channel being configured to transmit traffic between the first LAN of the first terminal and the second LAN of the second terminal;
   establishing, by the first conference unit, a connection with the first terminal to the first LAN;
   receiving, at the first conference unit, an input from the first terminal via the connection to access a combined local area network including the first LAN and the second LAN; and
   providing, by the first conference unit, a resource to the first terminal from the second LAN via the third data channel in response to the input.

2. The method of claim 1, wherein the resource is a cloud service of the second LAN.

3. The method of claim 2, wherein the cloud service is associated with the second terminal connected to the second LAN.

4. The method of claim 3, wherein the cloud service is a first cloud service, and the method further comprising:
   providing a second cloud service to the second terminal from the first LAN.

5. The method of claim 1, wherein the resource includes files available on the second LAN.

6. The method of claim 1, wherein the resource includes a printer available on the second LAN.

7. The method of claim 1, wherein the conference is established using SIP (session initiation protocol), H.323 or XMPP (extensible messaging and presence protocol).

8. The method of claim 1, further comprising: performing a discovery protocol, in response to the input from the first terminal.

9. The method of claim 7, wherein the resource on the second LAN is identified from the discovery protocol.

10. The method of claim 1, wherein the first terminal is a computer, a laptop, a tablet, or a mobile phone.

11. An apparatus including:
    a processor; and
    a memory storing instructions that when executed by the processor perform:
    receiving, at a first conference unit, a command to establish a conference between the first conference unit and a second conference unit using a first data channel configured to transport audio traffic for the conference and a second data channel configured to transport video traffic for the conference, the first conference unit being connected to a first terminal of a first local area network (LAN), the second conference unit being connected to a second terminal of a second LAN;
    establishing, by the first conference unit, a third data channel between the first conference unit and the second conference unit, the third data channel being configured to transmit traffic between the first LAN of the first terminal and the second LAN of the second terminal;
    establishing, by the first conference unit, a connection with the first terminal to the first LAN;
    receiving, at the first conference unit, an input from the first terminal via the connection to access a combined local area network including the first LAN and the second LAN; and
    providing, by the first conference unit, a resource to the first terminal from the second LAN via the third data channel in response to the input.

12. The apparatus of claim 11, wherein the resource is a cloud service of the second LAN.

13. The apparatus of claim 11, wherein the resource includes one or more files or one or more devices available on the second LAN.

14. The apparatus of claim 11, wherein the conference is established using SIP (session initiation protocol), H.323 or XMPP (extensible messaging and presence protocol).

15. The apparatus of claim 11, wherein the memory stores instructions that when executed by the processor perform a discovery protocol in response to the input from the first terminal and the resource on the second LAN is identified from the discovery protocol.

16. A conferencing system for establishing a conference, the system comprising:
- a first conference unit;
- a second conference unit;
- a first terminal configured to receive a command for the conference established between the first conference unit and the second conference unit, the conference utilizing a first data channel configured to transport audio traffic of the conference and a second data channel configured to transport video traffic of the conference, the first conference unit being connected to the first terminal and configured to establish a third data channel between the first conference unit and a second conference unit connected to a second terminal, the third data channel being configured to transmit traffic between a first local area network (LAN) of the first terminal and a second LAN of the second terminal such that the first LAN and the second LAN form a combined local area network, wherein the first conference unit and the second conference unit provide a resource to the first terminal from the second LAN via the third data channel in response to an input from the first terminal.

17. The conferencing system of claim 16, wherein the resource is a cloud service of the second LAN.

18. The conferencing system of claim 17, wherein the cloud service is associated with the second terminal connected to the second LAN.

19. The conferencing system of claim 16, wherein the cloud service includes file sharing or collaboration.

20. The conferencing system of claim 16, wherein the resource includes a file or a device available on the second LAN.

* * * * *